United States Patent [19]

Tamura

[11] Patent Number: 4,484,800
[45] Date of Patent: * Nov. 27, 1984

[54] CONTROL MECHANISM FOR A ZOOM LENS

[75] Inventor: Tetsuo Tamura, Kanagawa, Japan

[73] Assignee: Canon Kabushiki Kaisha, Tokyo, Japan

[*] Notice: The portion of the term of this patent subsequent to Apr. 19, 2000 has been disclaimed.

[21] Appl. No.: 416,221

[22] Filed: Sep. 9, 1982

Related U.S. Application Data

[63] Continuation of Ser. No. 151,757, May 20, 1980, Pat. No. 4,380,378.

[30] Foreign Application Priority Data

Jun. 13, 1979 [JP] Japan .................................. 54-74314

[51] Int. Cl.³ .............................................. G02B 7/10
[52] U.S. Cl. .................................................. 350/429
[58] Field of Search ........................................ 350/429

[56] References Cited

U.S. PATENT DOCUMENTS

| | | | |
|---|---|---|---|
| 3,330,615 | 7/1967 | Price | 350/429 |
| 3,437,404 | 4/1969 | Seedhouse | 350/429 |
| 3,506,338 | 4/1970 | Holderbaum | 350/429 |

Primary Examiner—John K. Corbin
Assistant Examiner—Rebecca D. Gass
Attorney, Agent, or Firm—Toren, McGeady and Stanger

[57] ABSTRACT

A mechanism for controlling synchronized operation of a zoom lens includes a cam mechanism defining a first camming surface and a supplementary camming surface for each of the lens components to be moved. A lens holder has an engagement member extending therefrom into abutment with the first camming surface and a spring member operatively interposed between a second engaging member and the lens holder urges the second engaging member against the supplementary camming surface thereby to insure that the first engaging member remains in abutment with the first camming surface to effect desired axial displacement of the lens component.

2 Claims, 5 Drawing Figures

CONTROL MECHANISM FOR A ZOOM LENS

This is a continuation of Ser. No. 151,757, filed May 20, 1980, now U.S. Pat. No. 4,380,378.

The present invention relates generally to lens assemblies and particularly to a control mechanism for a zoom lens assembly operative to effect axial adjustment of the components of the optical system of the zoom lens to effect change in the magnification of an object and image shift compensation.

In mounting mechanisms for a zoom lens known in accordance with the prior art there has been provided a cam sleeve controlling the synchronized operation of the components of the zoom lens system in order to vary the focal length of the system while compensating for the shift of the image caused by variation of the focal length. As the axial movement of the lens components is governed by the cam sleeve, the accuracy of control of the positions of the movable mounting components becomes of importance in determining whether the designated optical performance may be realized.

Recently, zoom lenses have found wide applicability in the field of imaging art. Most of the zoom lenses make use of a cylindrical cam with a cam follower which cooperates with a camming groove or slot in order to effect the prescribed axial movement of the components of the zoom lens system. Conventional camming arrangements take the form of a rigid roller engaged in a camming slot with some play or looseness, or of an elastic follower member made for example of rubber which is fitted therein. The type of device involving the rigid roller may assure smooth zooming operation, but because of the necessity for intentional formation of play between the camming slot and the roller, as zooming of the optical system is effected, the play causes the movable mounting components to remain insensitive to actuation despite the fact that the control mechanism is moved, thus causing deterioration in the optical performance of the device. On the other hand, when the rubber or elastic type of roller is utilized with a diameter slightly larger than the width of the camming slot, although it may operate to insure accurate relative adjustment of the movable zoom components by eliminating backlash which would otherwise occur from play between the camming slot and the follower, a disadvantage also arises in that friction between the camming slot edges and the surface of the follower makes it difficult to effect smooth management of the zoom lens.

Recent trends in the selection of materials for forming the cylindrical members of the mounting mechanism for zoom objectives and the like has been toward utilization of synthetic resins instead of metallic material. In cases where the aforementioned cam sleeve is manufactured by use of synthetic resin, molding techniques may be advantageously applied to enable achievement of economical mass production. However, it becomes rather difficult to effect adequate finishing of the camming slots of the cam sleeve to a sufficiently high accuracy by means of machining from the standpoint of the structure of the mold. Particularly, with a rigid roller type of cam follower, as the roller is guided by and follows either one of the edges of the camming slot, it is required that rather high accuracy be maintained in finishing the camming slot edges in order that there may be achieved a satisfactory configuration of the slot and an accurate slot width. Tolerance requirements give rise to significant problems, one of which relates to the necessity that the mold structure become rather complicated whereby compromises must be made without loss of assurance of high dimensional accuracy.

The present invention is intended to provide a control mechanism for a zoom lens which is capable of performing change in the magnification of the image and/or image shift compensation with high accuracy while assuring that the optical system accurately follows the camming surface of the cam member.

The invention is also intended to provide a lens adjusting mechanism which does not require high dimensional accuracy in the entire camming slot of the cam member but only in one camming slot edge which may be finished so that the position of the optical lens system may be controlled with high accuracy at all stations.

A further goal of the invention is the provision of a lens mounting mechanism which, when operated to move the optical lens system, will not give rise to unpleasant effects sensed by an operator due to backlashes or the like and which therefore may be smoothly and conveniently operated.

The invention also provides a mechanism which facilitates smoothness of the zooming operation in either direction from low to high magnification and vice versa.

A further aim of the invention is to minimize the necessary number of parts of a cam member which may be required to be finished to high dimensional accuracy whereby it is possible to provide a zoom lens which is available at a lower price inasmuch as the zoom lens mounting mechanism may be economically manufactured and easily assembled without the necessity for special fine adjusting steps.

In addition to the foregoing, the present invention is aimed to providing a zoom lens which is well suited for utilization of mass production techniques by employing a construction which enables the use of synthetic resin materials in making up part of the mounting mechanism for the zoom lens assembly.

SUMMARY OF THE INVENTION

Briefly, the present invention may be described as a mechanism for controlling operation of a zoom lens assembly comprising an optical lens system for the assembly, lens holding means for the optical system, engagement means connected with the lens holding means, cam means defining camming surface means having said engagement means engaged therewith, and an actuating member formed as part of said cam means and arranged to be rotated from outside of the lens assembly to effect control of axial movement of the optical lens system. The camming surface means are formed with a primary camming surface and a secondary or supplemental camming surface and the engagement means are arranged to engage both the primary and the auxiliary camming surfaces. Resilient means such as an arcuate spring are engaged between the lens holding means and the engagement means in order to apply a spring force which will cause the movement of the optical lens system to conform with the shape of the primary camming surface by maintaining the engagement means in continuous abutment therewith.

The engagement means of the invention may comprise a pair of engagement members, the first of which is engaged with the primary camming surface and the second of which is maintained against the secondary or auxiliary camming surface, and which as a result of abutment with the secondary camming surface and by operation of the resilient means causes a resilient spring force to be applied to the lens holding member to maintain the first engaging member against the primary camming surface.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
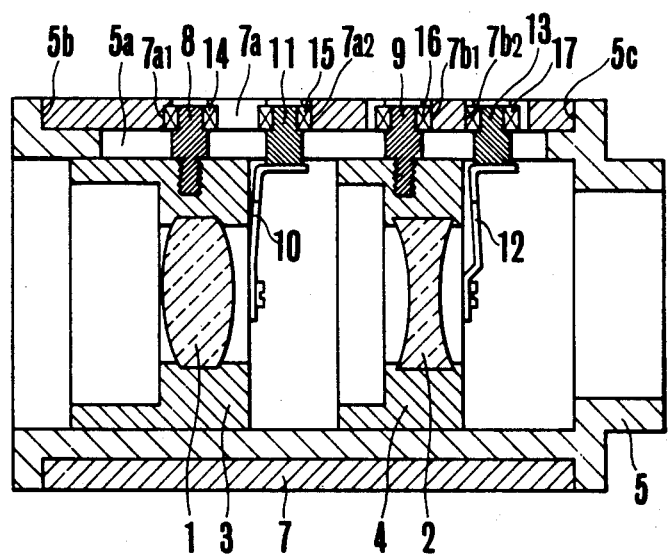
FIG. 1 is a schematic longitudinal sectional view of the principal parts of a zoom lens mounting assembly in accordance with the present invention excluding the focusing ring and a zooming actuator.
Figure 2:
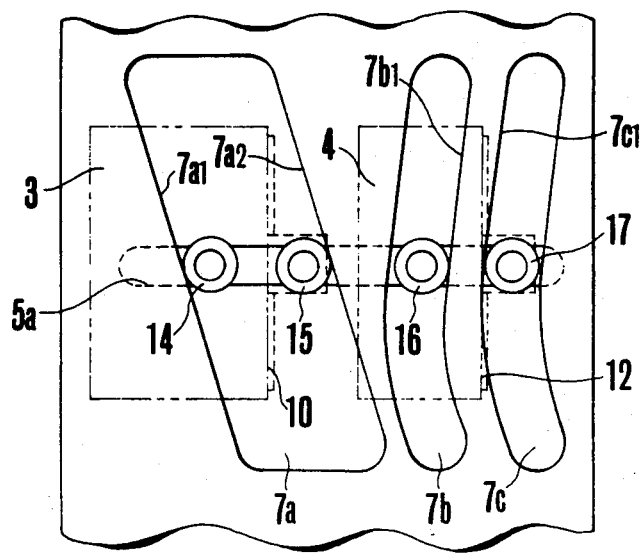
FIG. 2 is a fragmentary schematic view of the development surfaces of the cam member of the invention.

Referring now to the drawings wherein similar reference numerals are used to refer to similar parts throughout the various figures thereof, there is shown in FIG. 1 an embodiment of the present invention wherein an interchangeable lens assembly is depicted with an operating member for coupling the lens assembly to a camera body, which is not shown in the drawing. Similarly, for the purposes of clarity, FIG. 1 does not show the focus adjusting lens member and the image forming lens member.

In FIG. 1, the lens assembly shown includes a lens 1 which contributes to variation of the focal length of the lens system. A lens 2 operates to effect image shift compensation during zooming. First and second lens holding members 3 and 4 have mounted therein the aforementioned lens members 1 and 2, respectively, and they are axially movably fitted within the inner diameter of a tubular body 5. The tubular body 5 includes a mounting device (not shown) for attaching the interchangeable lens assembly of the invention to a camera body (not shown).

Mounted on each of the first and second lens holding members 3 and 4, respectively, are engagement members 8 and 9 which extend radially outwardly therefrom and which also extend through an axially aligned linear slot 5a formed in the wall of the tubular body 5.

The device of the invention also includes a cam member 7 having formed therein first and second camming slots 7a and 7b, with the engagement members 8 and 9 also extending into the first and second camming slots 7a and 7b.

As will be seen from FIG. 1, the cam member 7 is fitted upon the outer diameter of the tubular body 5.

The first camming slot 7a has an edge or cam surface 7a1 which operates to control axial movement of the lens 1 in order to effect change in image magnification. On the opposing surface of the camming slot 7a there is formed a supplementary camming edge 7a2 which is opposite to the camming edge 7a1. The cam member is restrained from axial movement by radial flanges 5b and 5c of the body tube 5. The second camming slot 7b is formed with an edge 7b1 for controlling axial movement of the lens 2 in order to effect image shift compensation.

A third camming slot 7c is disposed near the second camming slot 7b and has an edge 7c1 similar in orientation to the cam slot edge 7b1.

Figure 3:
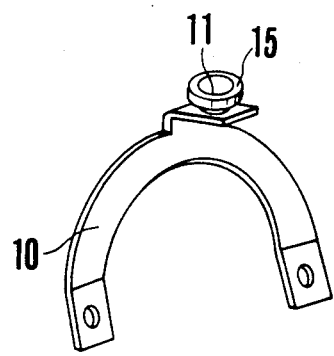
FIGS. 3 and 4 are perspective views of spring members utilized in the invention.

The assembly shown in FIG. 1 includes a spring member 10 and an engagement member 11 which constitute means for urging engagement member 8 into abutting engagement against the camming edge 7a1 of the cam slot 7a. The spring 10 is a leaf spring member formed with an arcuate configuration shaped like an inverted letter U or C, best seen in FIG. 3. The engagement member 11 is affixed to the spring member 10 and the spring member 10 is affixed at both its ends to the rear wall of the lens holding member 3 by screw fasteners whereby a spring force is exerted acting between the first lens holding member 3, or the cam slot edge 7a1, and the supplementary camming slot edge 7a2 through the engagement member 11 so that the engagement member 8 is pressed against the cam edge 7a1.

Figure 4:
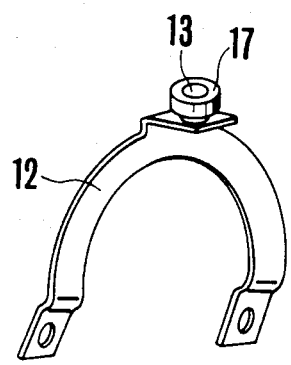

A similar mechanism including a spring 12 and an engagement member 13 is provided for urging the engagement member 9 into abutment against the second cam slot 7b1. The spring member 12, as best seen in FIG. 4, is also formed with an arcuate configuration in the shape of an inverted letter U or C and the engagement member 13 is affixed with the spring member 12. The spring member 12 is screw-fastened at its ends to the rear wall of the second lens holding member 4 in order to exert a spring force acting between the supplementary camming edge 7c1 and the lens holding member 4 or the cam edge 7b1 through the engagement member 13 so that the engagement member 13 is pressed against the cam edge 7b1.

Each of the engagement members 8, 9, 11 and 13 are generally formed as rod-like members and they are equipped with cam followers 14, 15, 16 and 17, respectively, which are rotatably mounted thereon and which may take the form of a ball bearing or a rotating roller so that sliding movement of each cam follower on the respective cam edge may occur with smoothness.

As will be apparent from the preceding description, the cam edge 7a1 operates as the primary camming edge of the first cam slot 7a and the secondary or supplementary camming edge 7a2 which is formed opposite to the first edge 7a1 operates to perform a supplementary function with regard to pressing of the engagement member 8 against the edge 7a1. Similar considerations apply with regard to the lens holding member 4 and the cam slots 7b and 7c. Accordingly, the fixed or unstressed positions of the spring members 10 and 12 must be such as to assume a position free from the influence of the spring force when mounted upon the first and second lens holding members 3 and 4 so that they will be placed into a stressed condition when assembly in order to exert the required spring force. For this purpose, the fitting length of the first and second lens holding members 3 and 4 on the tubular body 5 must be properly adjusted.

With regard to the members 10, 11, 15 and 12, 13, 17 for urging the cam followers 14 and 16 against the respective cam slot edges 7a1 and 7b1, respectively, since they act in a sense opposite to each other, the elements 10, 11, 15 for a variable lens system may be replaced or interchanged by the elements 12, 13, 17 and vice versa.

The spring force of each of the spring members 10 and 12 must be appropriately adjusted so that when the lens is held either in a normal position or in an inverted or vertical position, each of the lens members will not be caused to move by their own weight or the weight of the holder thereof.

Figure 5:
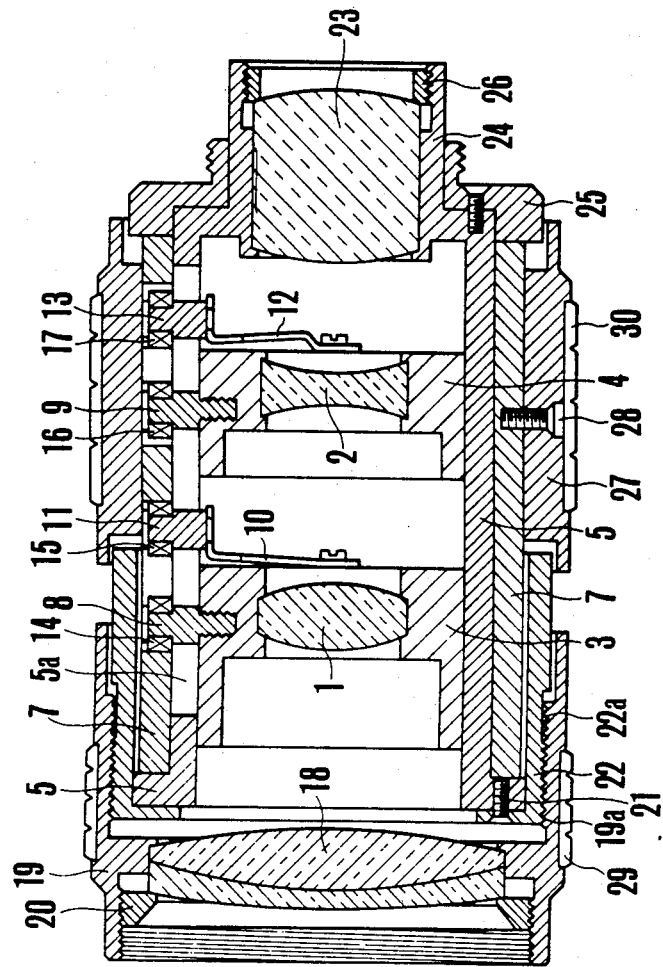
FIG. 5 is a longitudinal sectional view of a complete zoom lens with the mounting mechanism therefor.

In FIG. 5 there is shown an interchangeable lens assembly in accordance with the present invention wherein similar reference numerals to those previously employed in FIG. 1 are utilized. In FIG. 5, there is provided a lens member 18 affixed to a focusing ring 19 by a ring 20 which operates to perform focusing adjustment. The focusing ring 19 is screw-threaded on an intermediate sleeve 22 which is fixed to the tubular body 5 by fasteners 21 so that when the focusing ring 19 is turned, the image of an object is brought into focus. An image forming lens member 23 is held in a third lens holding member which is structured integrally with the tubular body 5. A mounting ring 25 affixed to the tubular body 5 is provided and a lens retainer ring 26 for the image forming lens member 23 is also provided. A zooming actuator ring 27 is fitted on the outer diameter of the cam member 7 in fixed relationship thereto by screws 28. Rubber rings 29 and 30 are provided for preventing slippage.

In the operation of the zoom lens assembly as described, focusing is performed by rotation of the ring 19, as previously described, whereby the focusing lens member 18 is moved axially of the assembly. Zooming is performed by rotating the actuator ring along with the cam member 7. As the cam member 7 rotates, the engagement members 8 and 9 are driven to move axially guided by the longitudinally elongated slot 5a. With the engagement members 11 and 13 pressed against their respective supplementary camming edges 7a2 and 7c1 by the action of the spring members 10 and 12, the spring forces which are created will assure that the cam followers 14 and 16 are maintained in contact with the cam edges 7a1 and 7b1 at all stations in the axial traverse of the lens members. As a result, there will occur controlled synchronized operation of the lens members 1 and 2 in order to effect change in the magnification of an object and image shift compensation.

The present invention has been described in connection with a specific embodiment thereof, utilizing as an example a so-called four-component optical lens system comprising the focusing member 18, the variator 1, the compensator 2 and the relay lens 23. This optical lens system may be obtained by utilizing an optical lens system of known construction in the art. It is also possible to utilize a lens system other than a four-component optical lens system for example, a lens system of a construction known in the art utilizing two or three lens components.

As previously indicated, the present invention is constructed to provide means for urging the engagement members or cam followers of the lens holding members 3 and 4 against the primary camming slot edges 7a1 and 7b1 of the cylindrical cam utilizing elements such as the elements 10, 11, 15 and 12, 13 17 and to provide as the urging means spring members which are arranged to constrain the lens holding members 3 and 4 between the primary and secondary cam slot edges 7a1, 7b1 and 7a2, 7c1. This gives rise to significant advantages in that, since the cam followers 14 and 16 are continuously urged against the camming edges 7a1 and 7c1 by the spring members 10 and 12, even when the camming edge is steeply curved, good adherence or follow movement with the desired path becomes possible thereby increasing the reliability of the zoom control.

Furthermore, since the secondary camming edges 7a2 and 7c1 which receive the forces of the spring members 10 and 12 function to press the cam followers 14 and 16 against the primary camming edges 7a1 and 7b1, the accuracy which is required for the width of the camming slot is not as high or as severe as would otherwise be necessary. Thus, with the present invention, in order to assure the desired performance, it is only required to limit the dimensions of the finished primary camming edges within given tolerances so that production costs may be reduced as compared with prior art structures. It will be seen that, in accordance with the prior art, a cam follower or roller of the rigid or elastic type is operated by contacting with either one of the camming slot edges in controlling the position of the optical lens system so that both edges of the camming slot must be finished to a high accuracy, thus making it difficult to reduce machining costs. Particularly in applications where the cam member is made of synthetic resin, the chamfering accuracy or the accuracy of curvature of the primary camming surface or edge may be improved while the secondary camming edge may be roughly machined whereby production costs may be reduced to a minimum and the degree of freedom in designing the mold interior for the parts may be increased.

Furthermore, the present invention operates to achieve a further significant advance in the management of the zoom lens in that, as has been previously mentioned, when zooming operation is performed by turning the cam member, the conventional control mechanism burdens the operator with a relatively large load as the roller must be frictionally engaged in the camming slot and it therefore becomes difficult to perform delicate adjustments in the positioning of the zoom actuator. Contrary to this, with the present invention, allowances are made for slight intentional play or looseness which is provided between the primary and secondary cam followers 14, 16, 15 and 17 and the respective camming slot edges 7a1, 7b1, 7a2 and 7c1, and use is made of cam followers having a rotary configuration. Therefore, torque required for rotation of the cam member is relatively small and the operating motion is smooth. As a result, a zoom lens is provided which may be easily and conveniently managed.

Particular advantages arise in designing a zoom lens having a high zoom ratio with a longer focal length which may range, for example, from 100 to 600 mm. Because of the avoidance of higher stresses when zooming operation is performed, it is possible to decrease the curvature of the camming edge of the cam member so that, with prior art devices, the length of the lens barrel is necessarily increased and the adjusting length of the lens components which are moved for zooming operation is also increased. This gives rise to a problem in that the resultant complete objective is difficult to handle and inconvenient to carry. In accordance with the present invention however, even when the gradient of curvature of the camming slot edge is increased, it is nevertheless insured that each cam follower will remain in contact with one and the same camming slot edge at all stations of operation. Therefore, the control mechanism of the present invention will be found well suited for use with a zoom lens having a high zoom ratio while still permitting high-speed zooming to be performed in either direction from low to high magnification and vice versa.

While a specific embodiment of the invention has been shown and described in detail to illustrate the application of the inventive principles, it will be understood that the invention may be embodied otherwise without departing from such principles.

What is claimed is:

1. A mechanism for controlling operation of a zoom lens assembly comprising:
    an optical lens system for said assembly;
    lens holding means for said optical lens system;
    a tubular body having a linear guide;
    cam means defining camming surface means,
    said camming surface means including a primary camming surface having an orientation and formed as one surface of said camming surface means and a supplementary camming surface having an orientation which is at least approximately the same as said orientation of said primary camming surface formed as a surface opposed to said primary camming surface;
    a spring member having one end being fixed to said lens holding means and another end which is free;
    engagement means comprising a first and second engagement member, said first engagement member being fixed to said lens holding means and contacting with said primary camming surface, said second engagement member being fixed to said free end of said spring member and contacting with said supplementary camming surface;
    said first and second engagement members passing through said linear guide of said tubular body so as to contact with the respective camming surfaces, said spring member applying its spring force in such a direction that said lens holding means follows said primary camming surface through said first engagement member.

2. A mechanism according to claim 1 wherein said engaging means comprise a member extending radially from said lens holding means and rotatable bearing means fitted on said radially extending member.

* * * * *